UNITED STATES PATENT OFFICE.

LUDWIG GRAF, OF MUNICH, GERMANY.

SOUP-FLAVORING.

1,032,201. Specification of Letters Patent. Patented July 9, 1912.

No Drawing. Application filed June 21, 1907. Serial No. 380,053.

*To all whom it may concern:*

Be it known that I, LUDWIG GRAF, a subject of the King of Bavaria, residing at Munich, in Germany, have invented certain new and useful Improvements in Soup-Flavorings, of which the following is a specification.

The purpose of the present invention is the manufacture of a product which by reason of its powerful meat-flavor can be used with advantage for strengthening soups and sauces. Preparations having the same purpose, and known in commerce under the general term of soup-flavorings, have hitherto been obtained from various substances, for example from meat-waste, edible mushrooms, soup-herbs, beer-yeast and the like, extracts being made by some suitable process from the said substances, and these extracts being in some cases freed from superfluous or unpalatable constituents, and concentrated.

In the methods hitherto known of producing soup-flavorings the process has always been to obtain or separate substances which have the flavor of meat, or a similar flavor, which already exist in some other substance or raw-material. The process hereinafter described is, on the other hand, one by which products having a powerful flavor of meat are produced by means of chemical reaction from pure albumin or derivatives, and products of the decomposition thereof, or from albumin modified by fermentation. This process is principally based on the treatment of albumin with hydrochloric acid or other reagent acting in an analogous manner in the presence of heat for a sufficient length of time, and by the subsequent neutralization of the digest thus obtained by means of bicarbonate of soda, carbonate of soda or hydrate of soda whereby a product having a very strong flavor of meat is obtained. This flavor is brought out with particular advantage by suitably diluting the neutral product with water, the efficiency or flavoring power being very great.

I have found that the reaction-products of the albumin treated with hydrochloric acid only become suitable for use as soup-flavoring matter after perfect neutralization by means of bicarbonate of soda, carbonate of soda, hydrate of soda or the like, and an observation of the greatest importance was that the decomposition of the albumin molecule must be as complete or far-reaching as possible in order to obtain a product suitable for the purpose stated, and that in general the purity and palatability of the flavoring increases with the duration and strength of the action of the hydrochloric acid on the albumin. For obtaining a good flavoring effect the decomposition of the albumin taking part in the reaction must certainly proceed so far that no considerable quantities of peptones are present in the liquid at the end of the reaction. The reaction is not instantaneous, but slow and gradual. The presence of only small quantities of peptones in the liquid is a reliable sign that the greater part of the albumin has been decomposed to yield matter in which the flavor of meat will be developed. It is noteworthy that the characteristic flavor of meat does not appear until the final stage of the neutralization is reached. From this it may be concluded that the acidulated solution probably contains higher molecular complexes, which do not possess the flavor referred to, but which are split up in the neutral solution and then constitute or yield the flavoring matter.

Observations made in the course of the process have shown that of the various kinds of albumin, casein is very suitable for the production of the flavoring matter. Casein is, moreover, cheap and easy to procure. Other kinds of albumin especially vegetable albumin and fibrin are, however, also suitable for the purpose, and also derivatives and products of decomposition thereof, and substances rich in albumin. The process of producing the flavoring matter is, for example, very easy and simple if albumin is used which is already in part decomposed by fermentation. The modes of operation which can be adopted in the laboratory when working with small quantities of matter are, however, not directly applicable to working on a commercial scale with larger quantities. Several difficulties were encountered in this direction and were only overcome by continued experiments and tests. A method of procedure which gives good results in practice will now be described.

Albumin swelled and slightly dried in the air is heated to approximately 70 or 80 degrees centigrade in earthenware vessels of approximately 100 liters capacity. The heating is performed by means of a water-bath, or preferably by means of an air-bath. A suitable quantity as hereinafter described of hydrochloric acid (preferably of specific gravity 1.19), is then poured over the albumin whereupon the vessel is closed and the mixture heated to approximately 100 degrees centigrade. After a suitable interval the cover is removed and the mixture thoroughly stirred, so that the albumin is brought into intimate contact with the acid. The cover is then replaced and the heating continued until uniform liquefaction has taken place. Thereupon an additional amount of fresh hydrochloric acid is added, and the heating is continued until the reaction has proceeded to the desired degree. This is shown by the fact that the liquid no longer contains peptones, or only comparatively small quantities thereof, which can be ascertained by means of the known tests. The duration of the decomposing action depends on the proportions of albumin and hydrochloric acid used, that is to say on the degree of concentration which the flavoring matter is to possess. If the degree of concentration is to be low, so that a considerable excess of hydrochloric acid can be used, the process of decomposition may be completed in 8 or 10 hours. If a high degree of concentration is desired the action must be of correspondingly longer duration. Since consumers desire a highly concentrated and powerful flavoring preparation it is in general necessary to use as large as possible a proportion of albumin; it has been found advantageous to use one part albumin and two parts hydrochloric acid. Using these proportions, and the mode of procedure described, approximately 14 days are required in order that the decomposition may proceed to the proper degree. The use of an air-bath enables the advantage to be obtained that the temperature of the mass may be kept above 100 degrees centigrade during the reaction, and by this means the time given for the reaction may be less than that required when a water-bath is used. The reaction product or digest obtained by the treatment described is a liquid of dark color, and the properties thereof do not in any way indicate suitability for dietetic purposes. This liquid is then placed in a large earthenware vessel with bicarbonate of soda, carbonate of soda, or hydrate of soda, and is completely neutralized, a stirring apparatus being used to assist the process. Part of the hydrochloric acid may be removed by evaporation before the neutralizing process. The neutral liquid is separated from the insoluble constituents, preferably by means of a suction-filter. The clear liquid is then cooled, and by this means common salt and other substances are separated. Thereupon the product is again clarified by filtration, and then constitutes a yellow, yellowish-brown or coffee-colored liquid, according to the proportions of albumin and hydrochloric acid used. The higher the proportion of hydrochloric acid, the lighter is the product and the purer, generally speaking, the meat-flavor thereof.

What I claim is:

1. The process of manufacturing a product of strongly meat like flavor which consists in heating, with strong hydrochloric acid, albumin of any nature and derivation, until the first occurring stage of peptonization is completely passed and the substance is converted into amino acids, neutralizing the resultant mixture with soda, and finally separating the insoluble unpalatable matter by filtration.

2. The process of manufacturing a product of strongly meat like flavor which consists in heating, with strong hydrochloric acid, substances rich in albumin of any nature and derivation, until the first occurring stage of peptonization is completely passed and the substance is converted into amino acids, neutralizing the resultant mixture with soda, and finally separating the insoluble unpalatable matter by filtration.

3. The process of manufacturing a product of strongly meat like flavor which consists in heating, with strong hydrochloric acid, derivatives and modifications of albumin of any nature and derivation, until the first occurring stage of peptonization is completely passed and the substance is converted into amino acids, neutralizing the resultant mixture with soda, and finally separating the insoluble unpalatable matter by filtration.

In witness whereof I have signed this specification in the presence of two witnesses.

LUDWIG GRAF.

Witnesses:
MATT GIEGEL,
LOUIS I. MUELLER.